March 28, 1967  E. FRITSCH  3,311,406
DEFLECTOR FOR HEAD WIND
Filed April 26, 1964  2 Sheets-Sheet 1

Inventor:
Erich Fritsch
by Michael J. Striker
his Attorney

March 28, 1967 E. FRITSCH 3,311,406
DEFLECTOR FOR HEAD WIND
Filed April 26, 1964 2 Sheets-Sheet 2
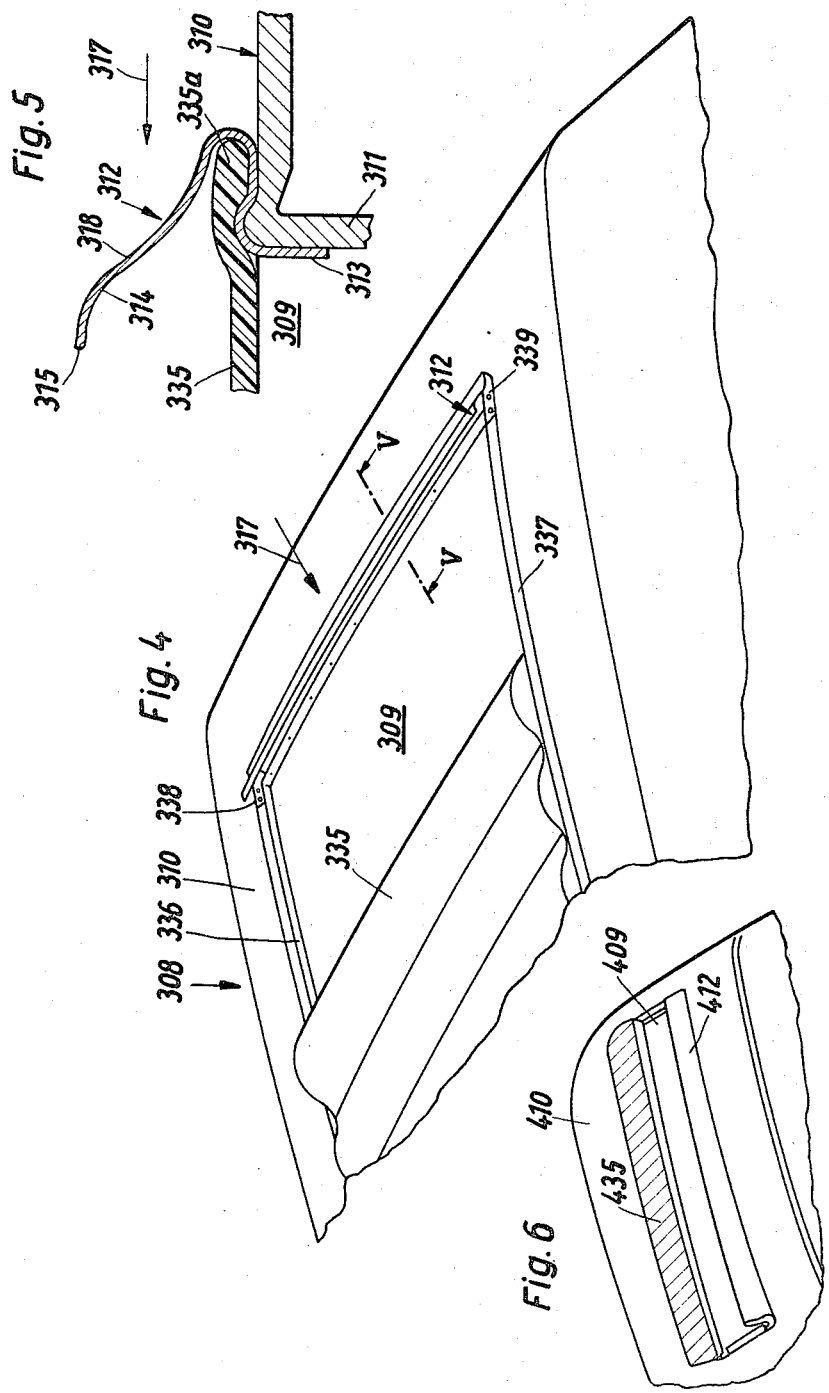
Inventor:
Erich Fritsch
by Michael J. Striker
his Attorney

United States Patent Office 3,311,406
Patented Mar. 28, 1967

3,311,406
DEFLECTOR FOR HEAD WIND
Erich Fritsch, Mettmann, Rhineland, Germany, assignor to Fritsch & Co. o.H.G., Mettmann, Rhineland, Germany
Filed Apr. 26, 1964, Ser. No. 363,251
Claims priority, application Germany, Aug. 28, 1963, F 24,461; Sept. 3, 1963, F 24,521; Dec. 18, 1963, F 25,060
1 Claim. (Cl. 296—91)

The present invention relates to automotive vehicles in general, and more particularly to a deflector which serves to prevent entry of head wind through an opening provided in that section of the body of an automotive vehicle which surrounds the top and the sides of the passenger compartment. Still more particularly, the invention relates to a deflector which is particularly suited to prevent entry of head wind through an opening provided in the roof skin of an automotive vehicle.

It is an important object of the invention to provide a very simple and inexpensive deflector which may be mounted on all or nearly all types of road vehicles, on watercraft, on many types of aircraft, on motorized sleds and on other types of conveyances which are arranged to travel at considerable speed so that the head wind which develops when the vehicle is in motion would be likely to create draft and noise and to thus affect the comfort of passengers whenever the opening is exposed.

Another object of the invention is to provide a deflector which is constructed and assembled in such a way that it automatically prevents eddying at the front corners of openings in the body of an automobile or a like vehicle, which can withstand wind, moisture and other adverse atmospheric conditions, which can be readily installed in many types of conventional automotive vehicles, which can be manufactured in any desired size, and which extends only little beyond the body of a vehicle so that it does not add appreciably to the resistance which the vehicle offers to movement against the wind.

A further object of the instant invention is to provide a deflector of the above outlined characteristics which may be made integral with the body of an automotive vehicle, which is equally useful in hard top vehicles and in vehicles with foldable roof panels, which can be installed in such a way that the opening which is shielded by its deflecting portion may be sealed in airtight manner to prevent entry of moisture, wind or dust, and which will not injure the occupants in the event of an accident.

Still another object of the invention is to provide a deflector of the above outlined characteristics which may be mass-produced in known machines and of readily available materials, which can be readily transferred from a discarded vehicle onto another vehicle, which does not detract from the appearance of the vehicle, and which adds little to the height or width of the vehicle.

Another object of the invention is to provide an automotive vehicle, particularly one which is used to travel at reasonably high speeds, and which embodies a deflector of the above outlined characteristics.

A concomitant object of the invention is to provide a hard top automobile or an automobile having a foldable roof panel, which embodies the above outlined deflector.

With the above objects in view, one feature of my invention resides in the provision of a deflector which is installed in an automotive vehicle of the type having an opening located in a plane generally parallel to the direction of head wind which develops when the vehicle is in motion and wherein the body of the vehicle comprises a transversely extending edge portion adjacent to the front end of the opening. The deflector comprises a holding portion which is permanently or detachably secured to the body of the vehicle, preferably to the edge portion at the front end of the opening, and an elongated blade-like deflecting portion extending along and outwardly beyond the edge portion and having a front face which preferably arches in a direction outwardly and rearwardly from the front end of the opening so as to deflect and to accelerate the head wind.

It is often desirable to configurate the deflecting portion in such a way that its longitudinal end portions extend along the lateral edge portions of the body, i.e., along the edge portions which are adjacent to the sides of the opening. Such longitudinal end portions prevent eddying at the corners and entry of wind along the sides of the opening.

The opening may be provided in the roof skin or in the side wall of an automotive vehicle.

The novel features which are considered as characteristic of the invention are set forth in particular in the appended claim. The improved deflector itself, however, both as to its construction and the mode of installing the same, together with additional features and advantages thereof, will be best understood upon perusal of the following detailed description of certain specific embodiments with reference to the accompanying drawings, in which:

FIG. 4 is a perspective view of a portion of an automobile body surrounding the opening for a foldable roof, and further illustrates a deflector which extends along that portion of the roof skin which is adjacent to the front end of the opening;

FIG. 5 is a greatly enlarged transverse vertical section through the deflector as seen in the direction of arrows from the line V—V of FIG. 4; and FIG. 6 is a fragmentary perspective view of the roof in a hard top automobile provided with a deflector which extends along the front end of the roof opening.

Figure 1:
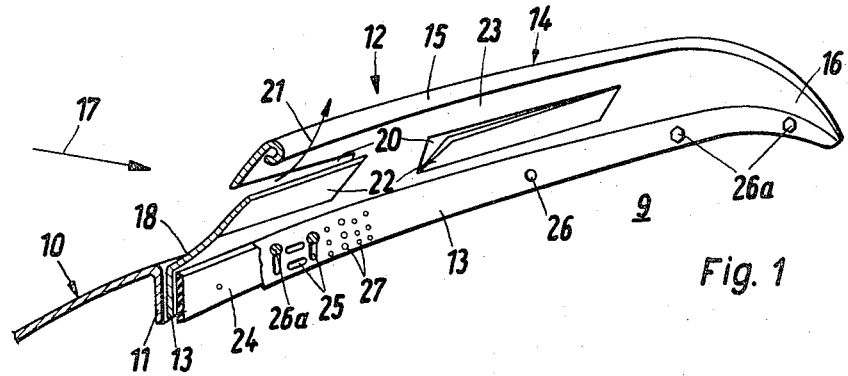
FIG. 1 is a fragmentary perspective view of a deflector which is installed on the roof of an automotive vehicle and which is bonded to the roof skin, the deflector being illustrated mainly from the rear.

Referring to FIG. 1, there is shown the roof skin 10 of a body in an automobile, and this skin defines a substantially rectangular roof opening 9 whose front end is bounded by a vertical or nearly vertical inwardly extending edge portion 11 of the skin 10. The edge portion 11 serves as a support for and is rigidly secured to an inner or holding portion 13 of a specially configurated deflector 12 which embodies my invention. The holding portion 13 is of constant thickness and is integral with an elongated blade-like deflecting portion 14 which extends outwardly (i.e., upwardly) and rearwardly from the front end of the opening and whose outer edge portion 15 is bent over itself to form a substantially U-shaped bead. The longitudinal end portions 16 (only one shown in FIG. 1) of the deflecting portion 14 extend rearwardly and along the sides of the opening 9 so as to prevent eddying at the corners and to prevent entry of air along the sides of the opening when the vehicle is in motion and when the head wind (arrow 17) impinges against a concave front side or face 18 of the deflecting portion. The front face 18 arches rearwardly and outwardly in a direction from the edge portion 11 toward the outer edge portion 15, and its function is to accelerate and to deflect the head wind so that the current of air will bypass the opening 9 and will not affect the comfort of the driver and/or of the passengers in the compartment whose top is bounded by the roof skin 10. The deflector also eliminates at least some noise which normally develops when the roof opening is exposed.

The deflecting portion 14 is provided with a series of apertures 20 which direct currents of air (arrows 21) upwardly and away from the opening 9 in the roof skin 10 because each thereof is located in front of an upwardly inclined flap 22 which is integral with the deflector 12 and which may be formed by bending the material of the deflecting portion 14 away from the front face 18. The purpose of the apertures 20 and flaps 22 is to relieve the deflector and to prevent the generation of vacuum at the rear side 23 of the deflecting portion.

The rear side of the holding portion 13 is adjacent to a weather-strip 24 which is partially broken away to reveal a series of horizontal and vertical slots 25, round bores 26, small perforations 27 and similar passages provided in the portion 13. Such holes, perforations and slots serve to facilitate fastening of the deflector 12 to the roof skin 10. Thus, the perforations 27 may serve to permit passage of a suitable adhesive which bonds the deflector to the edge portion 11 and which forms a layer along the front side of the holding portion 13. The slots 25 may serve to permit passage of screws 26a or similar threaded fasteners which at the same time allow for adjustment of the deflector with reference to the roof skin 10. The round holes 26 serve to receive portions of screws 26a or similar fasteners and to non-adjustably secure the deflector to the body of a vehicle. It goes without saying that the holding portion 13 may be provided only with perforations 27, only with holes 26 or solely with slots 25 and that FIG. 1 illustrates such a large variety of passages in the holding portion 13 merely to show various modes of attaching the deflector to the body of an automotive vehicle.

The weather-strip 24 may consist of rubber or elastic plastic and prevents penetration of air, moisture and/or dirt along the rear sides of the holding portion 13. If desired, a second weather-strip may be inserted between the front side of the holding portion 13 and the rear side of the edge portion 11.

I prefer to manufacture the deflector of light metal, particularly an alloy of aluminum, which is coated with a layer of oxide to prevent corrosion and to improve the appearance of the vehicle. For example, the surfaces of the deflector may be finished to a high degree of polish in a manner as disclosed in U.S. Patent No. 2,746,849. The process to which I may resort to finish the surfaces of the deflector may be a chemical process or I may resort to anodizing so as to produce a layer of oxide which can withstand moisture and other corrosive influences.

Figure 2:
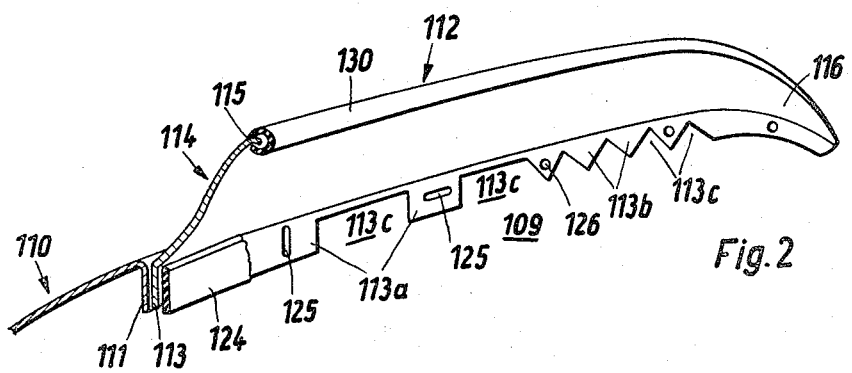
FIG. 2 is a similar fragmentary perspective view of a modified deflector which is also installed on the roof of an automotive vehicle.

FIG. 2 illustrates a slightly modified deflector 112 which differentiates from the deflector 12 in that the outer edge portion 115 of its deflecting portion 14 carries a tubular layer 130 of rubber or similar cushioning material to prevent injury to occupants in the event of an accident when the occupants might be hurled through the opening 109 in the roof skin 110. The holding portion 113 of the deflector 112 comprises a series of aligned sections or tongues including sections 113a of rectangular shape and sections 113b of triangular shape which are separated by cutouts 113c. The holes 126 and slots 125 shown in the sections 113a, 113b serve the same purpose as described in connection with FIG. 1. An important advantage of triangular sections 113b is that they are readily and conveniently insertable into the gap between the edge portion 111 of the roof skin 110 and the weather-strip 124, i.e., the deflector may be mounted or detached while the weather-strip remains secured to the roof skin.

Figure 3:
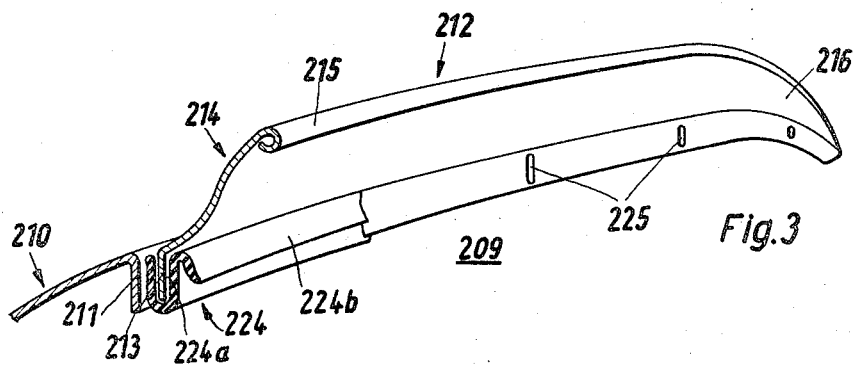
FIG. 3 is a fragmentary perspective view of a third deflector.

FIG. 3 shows a roof skin 210 with an edge portion 211 extending along the front end of an opening 209. The edge portion 211 is adjacent to one leg of a U-shaped weather-strip 224 which defines an elongated channel 224a serving to receive the holding portion 213 of a deflector 212. Thus, the front leg of the weather-strip prevents entry of foreign matter at the front side of the deflector. This deflector includes a deflecting portion 214 having an outer edge portion 215 which is rolled to form a tubular bead and to thus prevent injury to passengers in the event of an accident. The weather-strip 224 resembles an elongated pocket and comprises a rear leg which is provided with a lip 224b to conceal the fasteners which are driven through vertical slots 225 in the holding portion 213 to secure the deflector 212 to the edge portion 211. The slots 225 enable an operator to move the deflector outwardly or inwardly, depending on the dimensions and inclination of the opening 209. The lip 224b also serves as an abutment for the front edge of a sliding or foldable roof panel (not shown) which normally seals the opening 209. If desired, the lip 224b may be flexed outwardly to overlap the front edge of the roof panel when the latter closes the opening 209.

As a rule, the opening 9, 109 or 209 is located in a plane which is generally parallel with the direction of the wind, and this holds true if the opening is provided in the roof section or in a lateral section side wall of the body of an automotive vehicle. The height of the deflecting portion 14, 114 or 214 is always selected in such a way that the wind is deflected sufficiently to bypass the opening. In other words, the distance between the holding portion and the outer edge portion 15, 115 or 215 should suffice to keep the wind away from the passenger compartment.

Referring to FIG. 4, there is shown a portion of a body 308 in an automobile with a foldable roof panel 335. The roof skin 310 defines substantially rectangular opening 309 which is located in a plane generally parallel with the direction of head wind (arrow 317), and this roof skin comprises a downwardly extending edge portion 311 (see FIG. 5) which is adjacent to the front end of the opening 309. The deflector 312 comprises a substantially L-shaped holding portion 313 which abuts against the edge portion 311 and which overlies some of the roof skin in the front of the edge portion 311, and an elongated blade-like deflector 314 whose front face 318 curves outwardly and rearwardly with reference to the front end of the opening 309. In this embodiment of my invention, the deflecting portion 314 is without longitudinal end portions corresponding to those shown at 16, 116 and 216 in FIGS. 1 to 3, i.e., the deflecting portion 314 resembles a straight or nearly straight blade of constant width.

The roof panel 335 is slidable along guide rails 336, 337 which are adjacent to the lateral edge portions of the roof skin 310, and the end portions of the deflector 312 take the form of rearwardly extending plates 338, 339 which are respectively bolted to the rails 336, 337 or which may be secured to the roof skin at a level below the front ends of the rails. Thus, the plates 338, 339 actually constitute extensions of the holding portion 313 which is bolted or screwed to the roof skin 310.

FIG. 5 shows that the reinforced front edge portion 335a of the roof panel 335 overlaps the holding portion 313 when the opening 309 is closed so that the outer edge portion 315 of the deflecting portion 314 overlies the roof panel and thereby reduces the likelihood that dust, water, snow or air would penetrate into the passenger compartment when the opening 309 is closed.

If desired, the holding portion 313 may be positively locked to the roof panel 335 when the latter is moved to the closing position of FIG. 5. In such instances, the holding portion 313 may be provided with a suitable tongue or the like which snaps into a complementary recess of the roof panel.

Referring finally to FIG. 6, there is shown a portion of a roof skin 410 in a hard top automobile having a slidable metallic roof panel 435 which may expose or close a rectangular roof opening 409. The deflector 412 along the front end of the opening 409 corresponds to that of FIGS.

4 and 5, and serves to prevent entry of head wind when the vehicle is in motion. The manner in which the deflector 412 is secured to the roof skin 410 is preferably the same as shown in FIGS. 4 and 5.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

As a novel article of manufacture, a deflector for preventing the entry of head wind through an opening provided in that section of the body of an automotive vehicle which surrounds the top and the sides of a passenger compartment, comprising an elongated deflecting blade having an inner edge and an outer edge and a concave front side arranged to face the wind and extending from said inner to said outer edge, outwardly and rearwardly inclined from the front end of said opening, said deflecting blade being provided with at least one aperture and including a flap adjacent to said aperture and arranged to deflect outwardly and away from the opening such currents of air which pass through the aperture when the vehicle is in motion; and a holding portion rigid with said inner edge of said deflecting blade and arranged to be secured to the body of the vehicle.

References Cited by the Examiner

UNITED STATES PATENTS

| | | |
|---|---|---|
| 1,588,654 | 6/1926 | Brownlee. |
| 1,592,667 | 7/1926 | Lewis. |
| 2,173,890 | 9/1939 | Tuttle. |
| 2,519,446 | 8/1950 | Elsebusch. |

FOREIGN PATENTS

| | | |
|---|---|---|
| 66,541 | 11/1956 | France. |
| 1,001,129 | 1/1957 | Germany. |
| 1,022,481 | 1/1958 | Germany. |
| 21,897 | 1909 | Great Britain. |
| 747,081 | 3/1956 | Great Britain. |
| 47,925 | 5/1930 | Norway. |

BENJAMIN HERSH, *Primary Examiner.*

P. GOODMAN, *Assistant Examiner.*